April 24, 1951  H. G. MARSHALL  2,550,074
ADJUSTABLE VEHICLE SPRING ASSEMBLY
Filed July 23, 1947  3 Sheets-Sheet 2
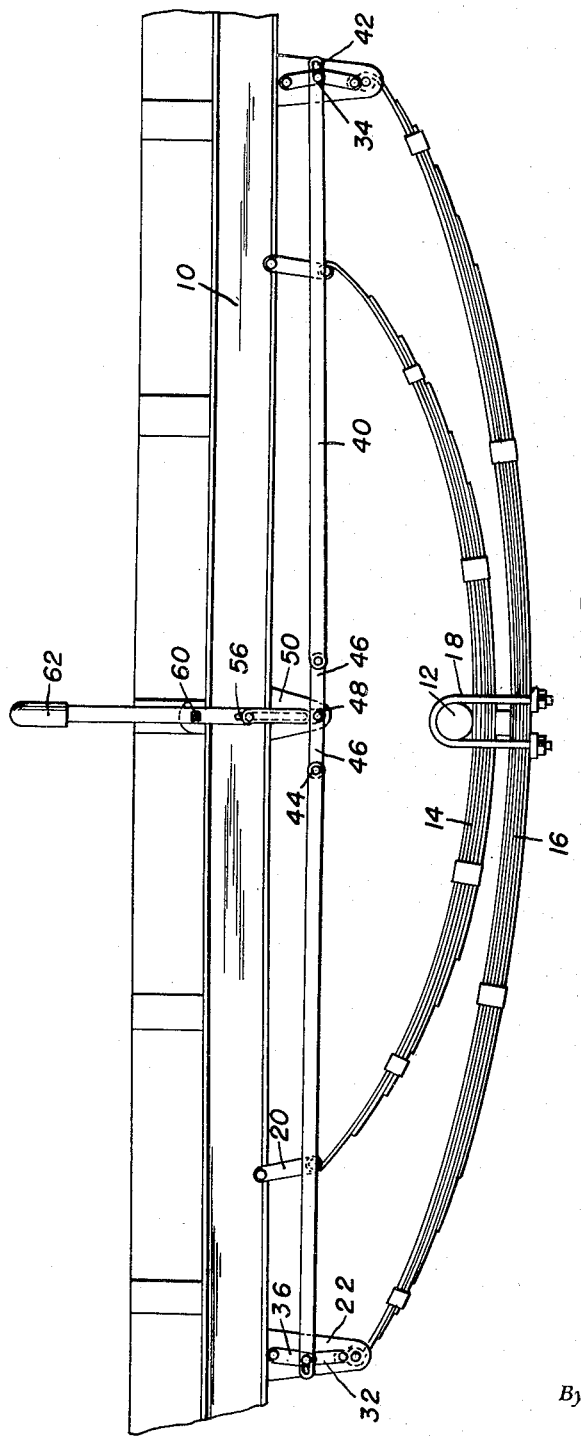
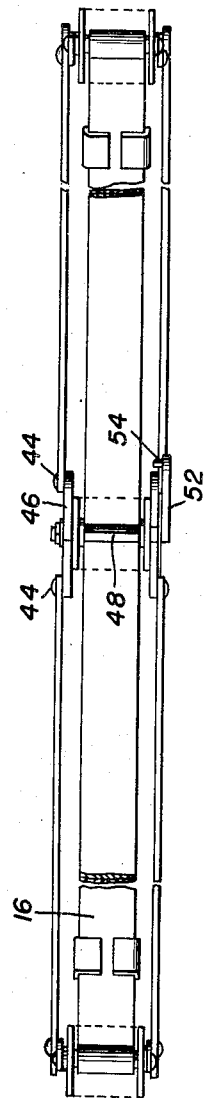
Inventor
Harry G. Marshall
By Clarence A. O'Brien
and Harvey B. Jacobson
Attorneys April 24, 1951  H. G. MARSHALL  2,550,074
ADJUSTABLE VEHICLE SPRING ASSEMBLY
Filed July 23, 1947  3 Sheets-Sheet 3
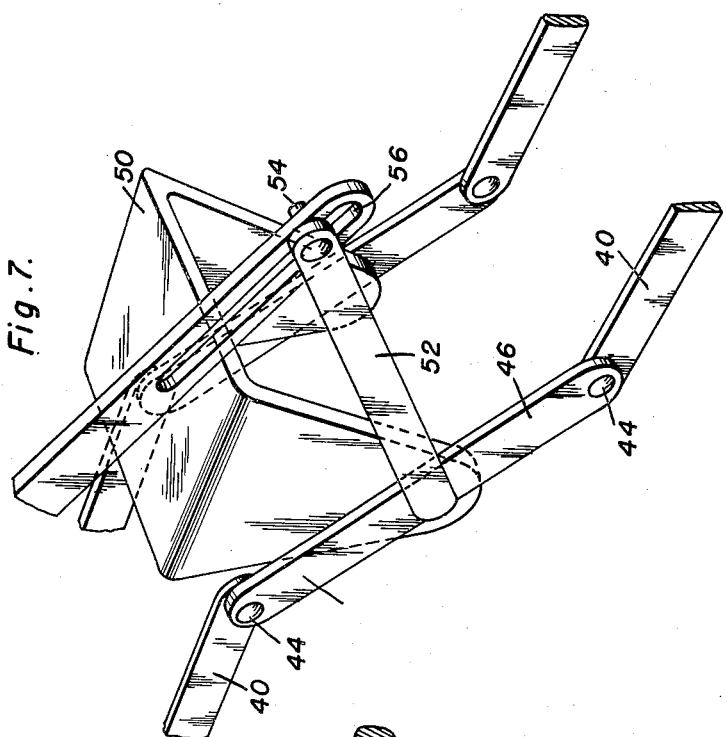
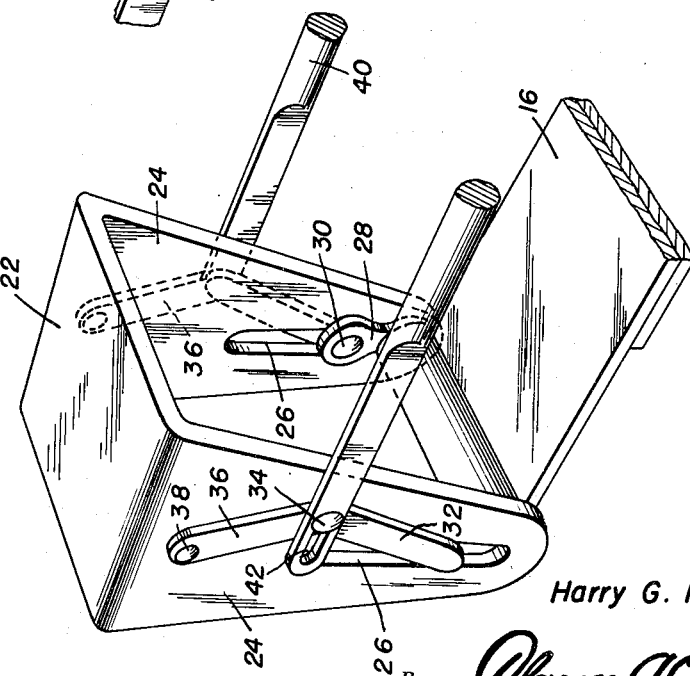
Inventor
Harry G. Marshall
By Clarence A. O'Brien
and Harvey B. Jacobson
Attorneys Patented Apr. 24, 1951

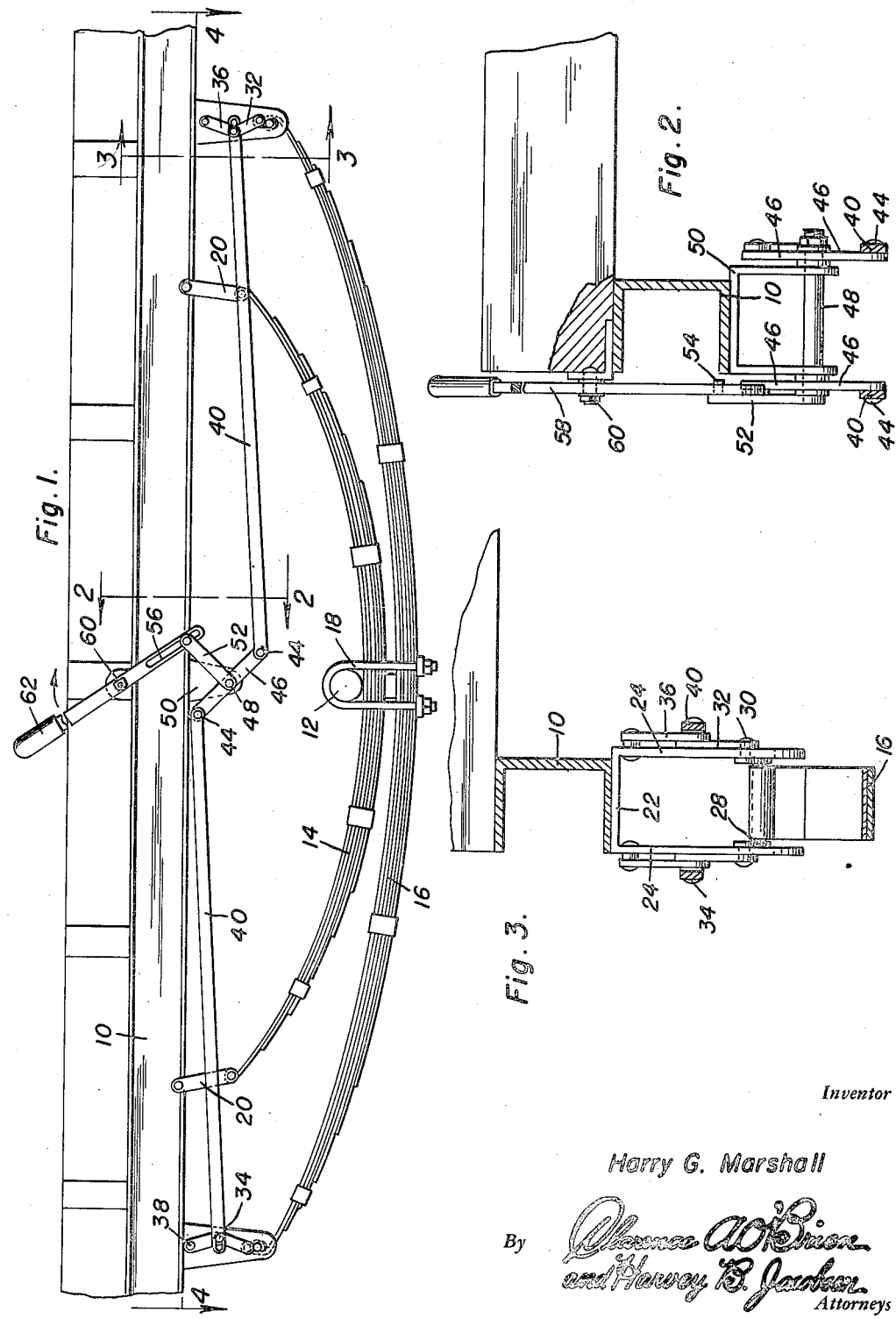

2,550,074

UNITED STATES PATENT OFFICE 2,550,074

ADJUSTABLE VEHICLE SPRING ASSEMBLY

Harry G. Marshall, New Westminster,
British Columbia, Canada

Application July 23, 1947, Serial No. 762,930

6 Claims. (Cl. 267—45)

This invention relates to novel and useful improvements in an adjustable vehicle spring assembly and more specifically pertains to a spring suspension for vehicles having a pair of springs which may be selectively employed to support the vehicle frame or which may be jointly used, to vary the riding characteristics, the load supporting ability of the spring assembly and for varying the flexibility of the ride afforded by the springs.

The principal object of this invention resides in providing a spring suspension assembly which may be initially built into the vehicle or which may be subsequently applied thereto with equal efficiency; and which may be adjusted to provide a flexible cushioning spring action for vehicles having light loads thereon, and which may be optionally adjusted for providing stronger spring action to enable the vehicle successfully to accommodate much greater loads.

A further object of the invention is to provide a spring assembly in accordance with the foregoing object, provided with novel means for instantaneously adjusting the tension or strength of a spring assembly for vehicles in accordance with the preference of the vehicle driver at any time.

Yet another object of the invention is to provide a secondary spring which may be selectively utilized to reinforce the primary spring or as a substitute therefor for increasing the resistance of the spring suspension of the vehicle for supporting heavier loads thereby.

And a still further important purpose of the invention resides in providing a secondary spring in accordance with the preceding objects wherein a novel and efficient type of spring shackle is provided for securing the ends of the spring to the vehicle frame in a manner for selectively varying the spring action of the supplemental spring.

These, together with various ancillary objects of the invention which will later become apparent as the following description proceeds, are attained by this device, the preferred embodiment of which has been illustrated, by way of example only, in the annexed drawings, wherein:

Figure 1 is a side elevational view of a portion of a vehicle frame showing the spring assembly of the instant invention applied thereto;

Figure 2 is a transverse vertical sectional detail view, parts being shown in elevation, of a portion of the vehicle and illustrating the control means for adjusting the device, and is taken substantially upon the plane of the section line 2—2 of Figure 1;

Figure 3 is a fragmentary detail view, taken in transverse vertical sections substantially upon the plane of the section line 3—3 of Figure 1 and showing the shackle means for mounting and adjusting the secondary spring;

Figure 4 is a top plan view of the secondary spring, parts being broken away;

Figure 5 is a side elevational view of the spring assembly, showing the same in a different position of adjustment from that in Figure 1;

Figure 6 is a fragmentary perspective view illustrating the construction for mounting and adjusting the secondary spring; and, Figure 7 is a fragmentary perspective detail view of the adjusting means for the spring assembly.

Referring now more specifically to the accompanying drawings, wherein like numerals designate similar parts throughout the various views, attention is directed first to Figure 1 where there is disclosed a portion of the frame work of an automotive vehicle of any suitable construction, which is indicated at 10 as including channel iron side frame members upon which the vehicle body is mounted. The vehicle is provided with the customary transversely extending axles, one of which is indicated at 12, it being understood that the same spring suspension may be applied to any other axle with which the vehicle is equipped.

The primary or main spring 14 and a secondary or supplemental spring 16 which are preferably of the well known semi-elliptical type, are secured intermediate their extremities to the transverse axle by means of common fastening clamps or bolts 18 in a well known manner. Preferably, the two springs are of different characteristics such that the primary spring 14 will be capable of giving a cushioning ride to a light load in the vehicle, while the secondary spring 16 may be of considerably greater stiffness for safely supporting over-loads in the vehicle.

At their extremities, the two springs are pivotally secured to the frame members 10 of the vehicle by means of shackles, those indicated at 20 for the primary spring being of known and conventional design.

As shown more clearly in Figures 3 and 6, the shackles provided at the extremities of the secondary spring 16, indicated at 22, are secured to a pair of downwardly extending bracket members 22 having parallel side arms 24. These arms are vertically slotted as at 26 to provide guide slots for a purpose to be sebsequently set forth.

A pair of links 28 are positioned between the side arms 24 of the brackets 22, and are connected by a pin, which extends through the customary eye provided at the extreme end of the secondary spring.

At their upper extremities, the links 28 are pivotally connected by a fastening means 30 which extends through the guide slots 26 and is slidable therein, to the lower extremities of toggle links 32 disposed on the outer sides of the brackets. Toggle links 32 are pivoted as at 34 to other and upper toggle links 36 which in turn are pivotally connected as at 38 to the side members 24 of the brackets. The toggle link members 32, 36, 34 constitute an extensible shackle. Connecting rods 40 are slotted as at 42 at their outer extremities, and are slidable upon the pivot pins 34, as shown clearly in Figure 6, whereby upon transverse movement of the connecting rods 40, the toggle links 32 and 36 will be relatively shifted to raise or lower the links 28 and thereby vertically elevate or lower the supplemental spring 16, with relation to the pivotal connection 38 carried by the brackets 22. The slot means 42 provides a lost motion connection between the connecting rods 40 and the toggle links, as will be readily understood.

As shown best in Figures 1 and 2, the inner extremities of the connecting rods 40 are pivotally connected as at 44 to oppositely extending lever arms 46 rigidly secured to a shaft 48 constituting a rocker shaft for operating the connecting rods, which shaft is journaled in the walls of a U-shaped depending bracket member 50 suitably secured to the frame member 10 at a convenient point.

At one extremity, the shaft 48 is provided with an arm 52 which has a laterally extending pin 54 slidable as indicated clearly in Figure 7, in an elongated slot 56 in the lower terminal end of a lever pivoted at 60 and provided at its upper extremity with an operating handle 62.

The operation of the device is as follows: With the parts in the position shown in Figure 1, the connecting rods 40 are drawn toward each other, and the toggle is broken, thereby elevating the outer extremities of the supplemental spring 16, and releasing the same from operative connection or load supporting relation to the frame members 10. In this position, the primary spring 14 is supporting the whole load of the vehicle frame and transferring the same to the axle 12, as when a truck is running light, or a passenger car or other vehicle is provided with a light load.

When it is desired to increase the strength of the spring assembly to support a greater load in the vehicle, it is merely necessary to pull the lever 62 towards the right as indicated by the arrow in Figure 1. During this movement, the rocker shaft will be rotated and the connecting rods will be operated to gradually lengthen the toggle links and thereby depress the ends of the secondary spring 16 downwardly away from the frame member 10, and thereby impart a part of the load of the vehicle to the secondary spring. As will be obvious during this operation, an increasingly large part of the load will be applied to the secondary spring and a lightening of the load upon the main spring will be effected, until at the maximum position of adjustment, as indicated in Figure 5, the toggle links will be substantially straight, the entire load will be carried by the secondary spring, and the main spring will be substantially free from load.

The device has been shown as illustrated with toggle adjusting means or shackles at each end of the secondary spring; but it will be readily understood that in some instances an ordinary shackle may be employed, with the adjusting means applied to one extremity only of the spring. Further, although semi-elliptical springs have been shown, it will be understood that the device is equally adaptable to the cantilever type of spring construction wherein one extremity is rigidly anchored to the frame and the other extremity is secured to the axle. In the event, it is to be understood that the device can be readily employed to supplement or serve as an alternative for a conventional spring suspension of a vehicle of any type, and when so assembled upon a vehicle is operable by a common adjusting means to manipulate the connection of the supplemental or secondary spring to the vehicle frame in such a manner as to vary from zero to a maximum the amount of load carried by either spring from the vehicle.

Since numerous modifications and improvements will be readily understood within the spirit of the invention by those skilled in the art after a consideration of the foregoing specification and drawings, it is not intended to limit the invention to the exact structure shown and described, but all suitable modifications and equivalents may be resorted to falling within the scope of the appended claims.

Having described the invention, what is claimed as new is:

1. A vehicle spring assembly including primary and secondary springs, said springs being rigidly attached to an axle, said primary spring being separately shackled to a vehicle frame, said secondary spring being provided at each end thereof with one end of a toggle link means having its other end pivotally attached to said vehicle frame and connecting means joining said toggle links.

2. The construction of claim 1 wherein said toggle link has a hinge pin engaging said connecting means, a lost motion coupling between said hinge pin and said connecting means.

3. A vehicle spring assembly including primary and secondary springs, said springs being rigidly attached to an axle, said primary spring being separately shackled to a vehicle frame, an extensible shackle connecting the terminals of said secondary spring to said vehicle frame, links connected to said extensible shackles and manual means for simultaneously operating said links for operatively connecting and releasing said secondary spring from said frame.

4. The construction of claim 3 wherein said manual means includes a shaft journaled on said frame, levers on said shaft connected to each of said links, a handle pivoted to said frame, and an arm on said shaft engaging said handle.

5. A vehicle spring assembly including primary and secondary springs, said springs being rigidly attached to an axle, said primary springs being separately shackled to a vehicle frame, said secondary spring being provided at each end thereof with an eye and being connected to a pair of links by pin means, said links being positioned between parallel side arms of brackets, said parallel side arms having guide slots, said links being pivotally connected by fastening means which extend through said guide slots to the lower sections of toggle links, the upper sections of said toggle links being pivotally connected to said parallel side members of said brackets, the upper and lower sections of said toggle links being pivotally connected by pivot pins; slotted connecting rods slidably mounted at their outer extremities on said pivot pins whereby upon transverse movement of said connecting rods said toggle links will be relatively shifted to vertically change the position of said links and thereby vertically change the position of said secondary spring, and means for inducing movement into said connecting rods.

6. The construction as in claim 5 wherein said means for inducing movement into said connecting rods comprise a rocker shaft secured to the inner extremities of said connecting rods, said rocker shaft being journaled in the walls of a U-shaped depending bracket member secured to said vehicle frame, an arm on said rocker shaft engaging a handle, said handle being pivotally attached to said vehicle frame.

HARRY G. MARSHALL.

REFERENCES CITED

The following references are of record in the file of this patent:

UNITED STATES PATENTS

| Number | Name | Date |
|---|---|---|
| 1,377,913 | Neff | May 10, 1921 |
| 2,224,717 | Austin | Dec. 10, 1940 |

FOREIGN PATENTS

| Number | Country | Date |
|---|---|---|
| 441,041 | France | May 18, 1912 |
| 28,396 | Great Britain | Dec. 9, 1912 |
| 22,471 | France | Jan. 22, 1921 |